(12) United States Patent
Jagan Mohan et al.

(10) Patent No.: US 11,994,956 B2
(45) Date of Patent: May 28, 2024

(54) ADAPTIVE THROTTLING OF METADATA REQUESTS

(71) Applicant: Cohesity, Inc., San Jose, CA (US)

(72) Inventors: Prem Krishnaa Jagan Mohan, Chennai (IN); Prajakta Ayachit, Pune (IN); Megha Agarwal, Baran (IN)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 18/073,303

(22) Filed: Dec. 1, 2022

(65) Prior Publication Data

US 2023/0185677 A1     Jun. 15, 2023

Related U.S. Application Data (63) Continuation of application No. 17/383,807, filed on Jul. 23, 2021, now Pat. No. 11,567,836.

(51) Int. Cl.
*G06F 11/14*     (2006.01)
*G06F 11/34*     (2006.01)

(52) U.S. Cl.
CPC ...... *G06F 11/1469* (2013.01); *G06F 11/1435* (2013.01); *G06F 11/1461* (2013.01); *G06F 11/1464* (2013.01); *G06F 11/3409* (2013.01); *G06F 2201/84* (2013.01)

(58) Field of Classification Search
CPC ............. G06F 11/1469; G06F 11/1435; G06F 11/1461; G06F 11/1464; G06F 11/3409; G06F 2201/84
See application file for complete search history.

(56) References Cited

U.S. PATENT DOCUMENTS

| | | | |
|---|---|---|---|
| 11,321,183 B2 * | 5/2022 | Pradhan | G06F 11/1471 |
| 11,442,816 B2 * | 9/2022 | Muehge | G06F 9/546 |
| 2015/0212895 A1 | 7/2015 | Pawar | |
| 2022/0138207 A1 | 5/2022 | Yelheri | |

* cited by examiner

*Primary Examiner* — Nadeem Iqbal
(74) *Attorney, Agent, or Firm* — Shumaker & Sieffert, P.A.

(57) ABSTRACT

An identification of a primary snapshot created for a primary storage system is received. A first request for a first metadata of a first file directory structure object associated with the primary snapshot is issued. A second request for data content of the first file directory structure object associated with the primary snapshot is determined to be sent to a recipient device based on a received response to the first request. A third request for a second metadata of a second file directory structure object associated with the primary snapshot is determined to be sent to the recipient device. Timing and ordering of issuance of a plurality of requests that at least include the second request and the third request to the recipient device are managed based on a determined performance metric of the recipient device and corresponding relative impact to the performance metric of the recipient device.

20 Claims, 7 Drawing Sheets

ADAPTIVE THROTTLING OF METADATA REQUESTS

CROSS REFERENCE TO OTHER APPLICATIONS

This application is a continuation of U.S. patent application Ser. No. 17/383,807 entitled ADAPTIVE THROTTLING OF METADATA REQUESTS filed Jul. 23, 2021 which is incorporated herein by reference for all purposes.

BACKGROUND OF THE INVENTION

A primary storage system includes a storage device (e.g., network-attached storage (NAS)) that is configured to generate a primary snapshot of the data stored in a storage volume of the storage device. The storage device may store a large number of directories and files (e.g., millions, billions, etc.). An incremental backup of the primary storage system may be generated based on the primary snapshot stored in the storage device and data included in the incremental backup is backed up from the primary storage system to a backup system. The backup system performs a full directory traversal of the primary snapshot to determine which objects (directories or files) to include in the incremental backup of the storage device. Subsequently, the backup system may request the data associated with the objects determined to be included in the incremental backup.

As an object is being encountered while the file directory structure is being traversed, the backup system sends to the storage device a request for metadata associated with the object to determine whether the object has changed. Responding to the request for metadata associated with the object is a CPU intensive operation for the primary storage system. The primary storage system is configured to run one or more processes. The amount of available CPU resources for the one or more processes is reduced when the primary storage system responds to requests for metadata. The primary storage system may become overburden with requests for metadata from the backup system while the file directory structure of the primary snapshot is being traversed. As a result, the performance of the one or more processes is significantly reduced.

BRIEF DESCRIPTION OF THE DRAWINGS

Various embodiments of the invention are disclosed in the following detailed description and the accompanying drawings.

DETAILED DESCRIPTION

A primary storage system can limit the amount of CPU resources that are available for use at any point in time. For example, the primary storage system may limit CPU utilization to 60% of the total CPU resources. The primary storage system can utilize a percentage of the total CPU resources to perform one or more primary processes associated with the primary storage system (e.g., execute a production system, run a database, etc.). A backup system may perform one or more processes while the primary storage system is performing the one or more primary processes. The one or more processes performed by the backup system may cause the consumption of resources on the primary system. For example, a backup system process may request information from the primary system, which causes the primary system to consume resources when it satisfies the request, contributing to the CPU loads, which are subject to the primary system's CPU resource limit. In some cases, the backup system may issue CPU intensive requests, causing the primary system to exceed its CPU resource limit. The resources consumed by the one or more processes may change during the day based on the CPU utilization of the one or more primary processes performed by the primary storage system. For example, between the hours of 8 am and 8 pm, the one or more primary processes of the primary storage system may consume 50% of the total CPU resources and the one or more processes performed by the backup system may be limited to cause the consumption of at most 10% of the total CPU resources while between the hours of 8 pm and 8 am, the one or more primary processes performed by the primary storage system may consume 10% of the total CPU resources and the one or more processes performed by the backup system may be limited to cause the consumption of at most 50% of the total CPU resources.

An incremental backup of the primary storage system may be performed at any point in time during the day. A backup system utilizes a distributed file system protocol to perform a complete traversal of the file directory structure of a primary snapshot to determine which objects (directories or files) to include in the incremental backup of the storage device. The file directory structure of the primary snapshot is traversed instead of the file directory structure of the primary storage system because the file directory structure of the primary snapshot represents the file directory structure at a particular point in time whereas the file directory structure of the primary storage system is a live directory that may change over time.

Other backup systems may send to the primary storage system a plurality of requests for metadata associated with a file directory structure object at each node of the primary snapshot's file directory structure. In response, the primary storage system is configured to retrieve and provide the metadata associated with the file directory structure object to the backup system. Responding to a request for metadata associated with the file directory structure object may be performed quickly, but is a CPU intensive operation for the primary storage system.

The metadata associated with a file directory structure object may indicate that the file directory structure object has changed since a previous backup and should be included in an incremental backup of the primary storage system. The backup system may send to the primary storage system a request for data content associated with a file directory structure object to be included in the incremental backup. Responding to the request for data content associated with the file directory structure is not a CPU intensive operation for the primary storage system. In response to the request, the primary storage system provides the data content associated with the file directory structure object and the backup system ingests the provided data. The primary storage system utilizes a particular amount of CPU resources to provide the data content associated with the file directory structure object and a backup system needs a certain amount of time to ingest the data content associated with the file directory structure object.

Other backup systems may request metadata without regard for when the results of such requests may be used or required for subsequent processing. For example, a backup system may send to the primary storage system a request for metadata for a file directory structure object before the metadata is required and/or when the backup system is unable to ingest the data content associated with the file directory structure object. However, responding to metadata requests is a CPU intensive operation for the primary storage system. These metadata requests may cause the primary storage system's CPU resource limit to be exceeded. In some situations, the metadata requests may cause the primary storage system's CPU to overheat and/or malfunction. Thus, these metadata requests were unnecessarily burdening the primary storage system's CPU resources by requesting the metadata before it was required and/or when the backup system was incapable of ingesting the data content associated with a file directory structure object.

A technique to adaptively throttle requests for metadata associated with a plurality of file directory structure objects (e.g., directories, files, softlinks, hardlinks, etc.) is disclosed herein. Instead of indiscriminately sending the primary storage system a plurality of requests for metadata associated with a plurality of file directory structure objects, the technique adaptively throttles the metadata requests in a manner such that a request for metadata associated with a file directory structure object is sent to the primary storage system at a time proximate to when the backup system requires the metadata for additional processing and/or is capable of ingesting the data content associated with the file directory structure object. Data content requests are made in the event the metadata associated with the file directory structure object indicates the file directory structure object has changed since a previous backup. The technique enables data content associated with file directory structure objects to be ingested at the backup system in a manner that does not underutilize or overutilize the resources of the backup system without potentially overutilizing the primary storage system's CPU resources (i.e., exceeding the CPU utilization limit).

A file directory structure of the primary snapshot is comprised of a plurality of file directory structure nodes. The backup system is comprised of a plurality of backup nodes. In some embodiments, a backup node is assigned to the entire file directory structure of the primary snapshot. The backup node is configured to traverse the file directory structure, identify changed objects, and backup the identified changed objects.

In some embodiments, the file directory structure of the primary snapshot is divided into a plurality of portions. In some embodiments, some of the backup nodes are assigned a corresponding portion of the file directory structure of the primary snapshot. In some embodiments, each of the backup nodes are assigned a corresponding portion of the file directory structure of the primary snapshot. The backup nodes that are assigned a portion of the file directory structure are configured to, in parallel, traverse the assigned portion of the file directory structure, identify changed objects, and backup the identified changed objects. A backup node may traverse the assigned portion of the file directory structure, for example, in-order, preorder, postorder, or level order.

The technique includes a backup node managing timing and ordering of requests for metadata associated with file directory structure objects and requests for data content associated with file directory structure objects based on a determined performance metric of a recipient device of the primary storage system and corresponding relative impact of a metadata request or data content request to the performance metric of the recipient device.

In some embodiments, a primary backup node of the backup system determines a performance metric of the primary storage system (e.g., CPU utilization) and provides the determined performance metric to one or more other secondary backup nodes of the backup system. In some embodiments, each of the plurality of backup nodes independently determines a performance metric of the primary storage system. The performance metric of the primary storage system may be periodically determined (e.g., every 10 seconds).

In some embodiments, a performance metric of the primary storage system is directly determined. For example, a backup node of the backup system may poll the primary storage system for a current CPU utilization value. In some embodiments, a performance metric of the primary storage system is indirectly determined. For example, the performance metric of the primary storage system may be determined based on a round trip time associated with a communication between the backup system and the primary storage system. The performance metric may be inferred from the round trip time.

The backup node manages timing and ordering of requests for metadata associated with file directory structure objects and requests for data content associated with file directory structure objects utilizing a token request system. The token request system is used to prevent the determined performance metric of the recipient device from exceeding the CPU utilization limit. In some embodiments, the backup node utilizes a single queue for metadata and data content requests, as described below with respect to FIG. 4, to manage timing and ordering of requests for metadata associated with file directory structure objects and requests for data content associated with file directory structure objects. In some embodiments, the backup node utilizes separate queues for metadata requests and data content requests, as described below with respect to FIG. 5, to manage timing and ordering of requests for metadata associated with file directory structure objects and requests for data content associated with file directory structure objects.

A backup node is configured to assign a cost to a particular type of request, i.e., the number of tokens needed to issue the request. The cost or number of tokens needed to issue a request may be heuristic-based from historical data and metadata requests. The number of tokens needed to issue a request varies based on a current performance metric of the primary storage system. The cost for a particular type of request assigned by the backup node at a particular moment is time is based on a determined performance metric of the primary storage system.

As the backup node traverses an assigned portion of the file directory structure, the backup node issues to the recipient device requests for metadata associated with a file directory structure object and/or data content associated with a file directory structure object. The backup node is able to send the request based on whether the backup node has a sufficient number of tokens to issue the request. The backup node consumes tokens from the total number of available tokens when a request is issued. The cost associated with a request for metadata associated with a file directory structure object is greater than (e.g., 2×) the cost associated with a request for data content associated with a file directory structure object: that is, a request for metadata associated with a file directory structure object requires more tokens than a request for data content associated with a file directory structure object. The assigned cost, the number of available tokens, or both, is dynamic in nature and is periodically updated based on a determined performance metric of the primary storage system. This throttles the requests for metadata associated with a plurality of file directory structure objects in a manner that reduces the likelihood that the primary storage system's CPU resource limit is exceeded while enabling data content associated with file directory structure objects to be ingested by the backup node in a manner that does not underutilize the resources or overwhelm the backup node.

Figure 1A:
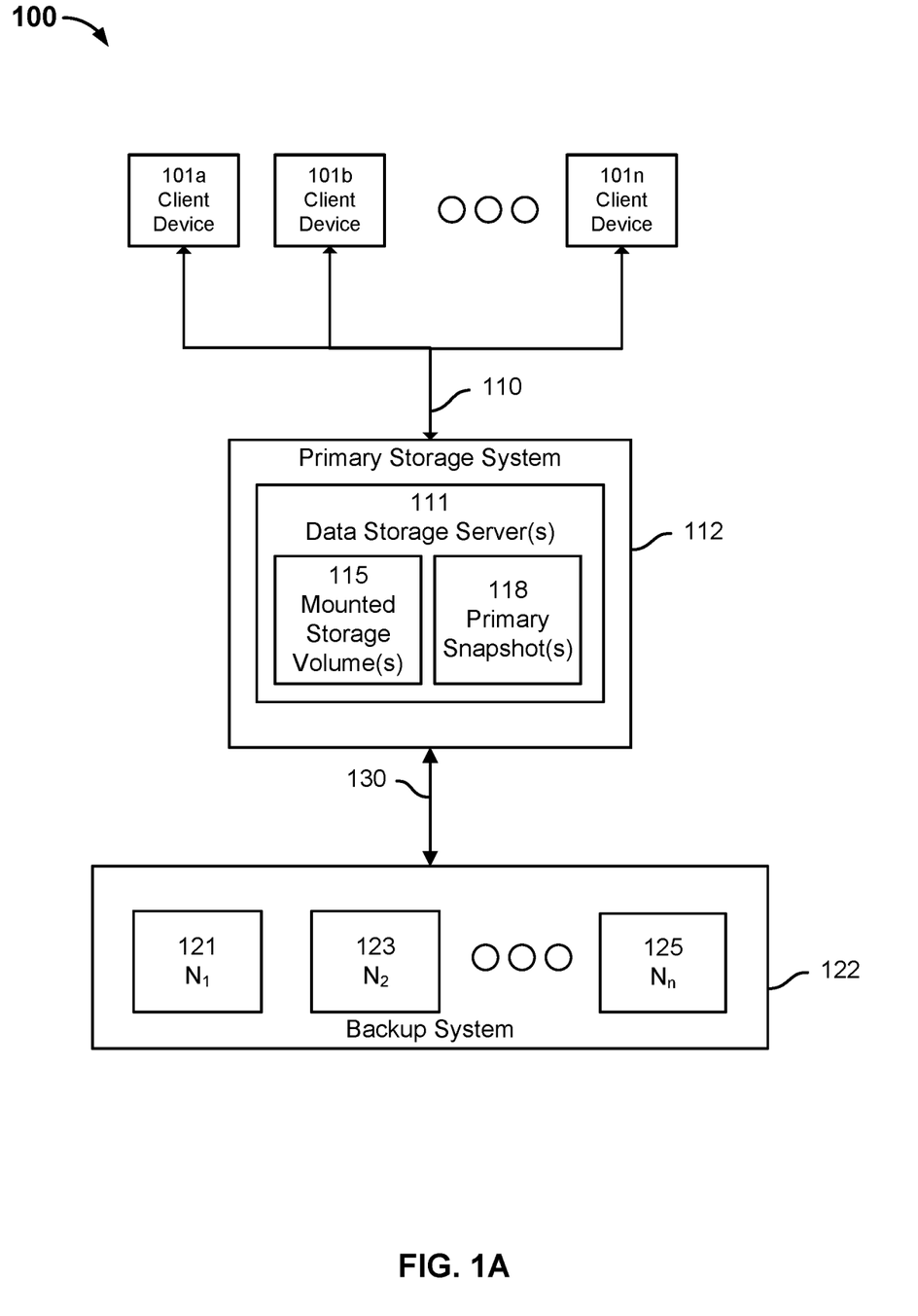
FIG. 1A is a block diagram illustrating an embodiment of a system for adaptively throttling metadata requests.

FIG. 1A is a block diagram illustrating an embodiment of a system for adaptively throttling metadata requests. In the example shown, system 100 is comprised of client devices 101a, 101b, . . . , 101n, primary storage system 112, and backup system 122. Although three client devices are shown, system 100 may be comprised of one to n client devices. A client device may be a computing device, such as a computer, a laptop, a desktop, a tablet, a mobile device, etc. Client devices 101a, 101b, 101n may store one or more objects to primary storage system 112. Primary storage system 112 is comprised of one or more data storage servers 111. The one or more objects may be stored in a storage device of the one or more data storage servers 111. An example of a storage device is a network-attached storage device. Although one storage device is shown, primary storage system may be comprised of n storage devices. The techniques disclosed herein may be performed with respect to each data storage server in the event primary storage system 112 includes a plurality of data storage servers.

Primary storage system 112 is configured to provide file-based data storage services to client devices 101a, 101b, 101n. Primary storage system 112 includes one or more mounted storage volumes 115 that store the data associated with one or more files, the metadata associated with the one or more files, data associated with one or more directories, and metadata associated with one or more directories. Primary storage system 112 is configured to generate and store one or more primary snapshots 118 of the data stored in a storage volume. Backup system 122 may use a distributed file system protocol (e.g., network file system) to remotely access primary storage system 112 and its contents (e.g., one or more storage volumes 115, one or more primary snapshots 118).

Client devices 101a, 101b, 101n may access the one or more objects stored in primary storage system 112 and perform one or more file operations with respect to the one or more objects stored in primary storage system 112. A file operation may include a write operation, a read operation, a delete operation, a move operation, a creation operation, a modify metadata operation (e.g., change permissions, change ownership, etc.) etc. In some embodiments, the one or more file operations include creating a directory, deleting a directory, modifying a directory, moving a directory, etc.

Client devices 101a, 101b, 101n are connected to primary storage system 112 via network 110. Network 110 may be a local area network, a wide area network, a personal area network, a wireless local area network, a storage-area network, etc., or a combination thereof. Primary storage system 112 is connected to backup system 122 via network 130. Network 130 may be a local area network, a wide area network, a personal area network, a wireless local area network, a storage-area network, etc., or a combination thereof.

Backup system 122 is comprised of a plurality of backup nodes 121, 123, 125. Although three backup nodes are shown, backup system 122 may be comprised of n backup nodes. In some embodiments, a backup node of backup system 122 includes a processor, memory, and a plurality of storage devices. The plurality of storage devices may include one or more solid state drives, one or more hard disk drives, or a combination thereof. Backed up data may be stored in the one or more solid state drives, one or more hard disk drives, or a combination thereof.

In some embodiments, a backup node of backup system 122 includes a processor and memory, and is coupled to a separate storage device. The separate storage device may include one or more storage devices (e.g., flash storage devices). A storage device may be segmented into a plurality of partitions. Each of the backup nodes may be allocated one or more of the partitions. The one or more partitions allocated to a backup node may be configured to store data associated with some or all of the changed objects that were backed up to backup system 122. For example, the separate storage device may be segmented into 10 partitions and backup system 122 may include 10 backup nodes. A backup node of the 10 backup nodes may be allocated one of the 10 partitions.

In some embodiments, a backup node of backup system 122 includes a processor, memory, and a storage device. The backup node may be coupled to a separate storage device. The separate storage device may include one or more storage devices. A storage device may be segmented into a plurality of partitions. Each of the backup nodes may be allocated one or more of the partitions. The one or more partitions allocated to a backup node may be configured to store data associated with some or all of the changed objects that were backed up to backup system 122. For example, the separate storage device may be segmented into 10 partitions and storage cluster 112 may include 10 backup nodes. A backup node of the 10 backup nodes may be allocated one of the 10 partitions.

In some embodiments, the backup nodes are homogenous nodes where each backup node has the same capabilities (e.g., processing, storage, memory, etc.). In some embodiments, at least one of the backup nodes is a heterogeneous node with different capabilities (e.g., processing, storage, memory, etc.) than the other backup nodes of backup system 122.

Backup system 122 is configured to implement a technique to adaptively throttle requests for metadata associated with a plurality of file directory structure objects. Instead of indiscriminately sending primary storage system 112 a plurality of requests for metadata associated with a plurality of objects, backup system 122 adaptively throttles the metadata requests in a manner such that a request for metadata associated with a file directory structure object of a primary snapshot 118 is sent to primary storage system 112 at a time proximate to when backup system 122 is capable of ingesting the data content associated with the file directory structure object in the event the metadata associated with the file directory structure object indicates the file directory structure object has changed since a previous backup. This enables data content associated with file directory structure objects to be ingested at backup system 122 in a manner that does not underutilize or overutilize the resources of the backup system without potentially overutilizing the primary storage system's CPU resources (i.e., exceeding the CPU utilization limit).

A file directory structure of a primary snapshot 118 is comprised of a plurality of file directory structure nodes. Backup system is comprised of backup nodes 121, 123, 125. In some embodiments, one of the backup nodes 121, 123, 125 is assigned to the entire file directory structure of a primary snapshot 118. The backup node is configured to traverse the file directory structure, identify changed objects, and backup the identified changed objects.

In some embodiments, the file directory structure of the primary snapshot 108 is divided into a plurality of portions. In some embodiments, some of the backup nodes 121, 123, 125 are assigned a corresponding portion of the file directory structure of primary snapshot 108. In some embodiments, each of the backup nodes 121, 123, 125 are assigned a corresponding portion of the file directory structure of the primary snapshot 108. The backup nodes that are assigned a portion of the file directory structure are configured to, in parallel, traverse the assigned portion of the file directory structure, identify changed objects, and backup the identified changed objects. A backup node may traverse the assigned portion of the file directory structure in-order, preorder, postorder, or level order.

A backup node manages timing and ordering of requests for metadata associated with file directory structure objects and requests for data content associated with file directory structure objects based on a determined performance metric of primary storage system 112 and corresponding relative impact of a metadata request or data content request to the performance metric of primary storage system 112.

In some embodiments, a primary backup node of backup system 122 determines a performance metric of primary storage system 112 (e.g., CPU utilization of data storage server 111) and provides the determined performance metric to one or more other secondary backup nodes of backup system 122. In some embodiments, each of the backup nodes 121, 123, 125 independently determines a performance metric of primary storage system 112. The performance metric of primary storage system 112 may be periodically determined (e.g., every 10 seconds).

In some embodiments, a performance metric of the primary storage system 112 is directly determined. For example, a backup node of backup system 122 may poll primary storage system 112 for a current CPU utilization value. In some embodiments, a performance metric of primary storage system 112 is indirectly determined. For example, the performance metric of primary storage system 112 may be determined based on a round trip time associated with a communication between backup system 122 and primary storage system 112 (e.g., the latency between one of the backup nodes 121, 123, 125 and data storage server 111).

The backup node manages timing and ordering of requests for metadata associated with file directory structure objects and requests for data content associated with file directory structure objects utilizing a token request system. The token request system is used to prevent the determined performance metric of the recipient device from exceeding the CPU threshold for one or more processes. In some embodiments, the backup node utilizes a single queue for metadata and data content requests to manage timing and ordering of requests for metadata associated with file directory structure objects and requests for data content associated with file directory structure objects. In some embodiments, the backup node utilizes separate queues for metadata requests and data content requests to manage timing and ordering of requests for metadata associated with file directory structure objects and requests for data content associated with file directory structure objects.

A backup node is configured to assign a cost to a particular type of request, i.e., the number of tokens needed to issue the request. The number of tokens needed to issue a request may be heuristic-based from historical data and metadata requests. The number of tokens needed to issue a request varies based on a current performance metric of the primary storage system. The cost for a particular type of request assigned by the backup node at a particular moment in time is based on a determined performance metric of primary storage system 112. As the backup node traverses an assigned portion of the file directory structure, the backup node issues to the recipient device requests for metadata associated with a file directory structure object and/or data content associated with a file directory structure object. The backup node is able to send the request based on whether the backup node has a sufficient number of tokens to issue the request. The backup node consumes tokens from the total number of available tokens when a request is issued. The cost associated with a request for metadata associated with a file directory structure object is greater than (e.g., 2×) the cost associated with a request for data content associated with a file directory structure object, that is, a request for metadata associated with a file directory structure object requires more tokens than a request for data content associated with a file directory structure object. The assigned cost, the number of available tokens, or both, is dynamic in nature and is periodically updated based on a determined performance metric of primary storage system 112. This throttles the requests for metadata associated with a plurality of file directory structure objects in a manner that reduces the likelihood that the CPU resource limit of primary storage system 112 is exceeded while enabling data content associated with file directory structure objects to be ingested by the backup node in a manner that does not underutilize the resources or overwhelm the backup node.

Figure 1B:
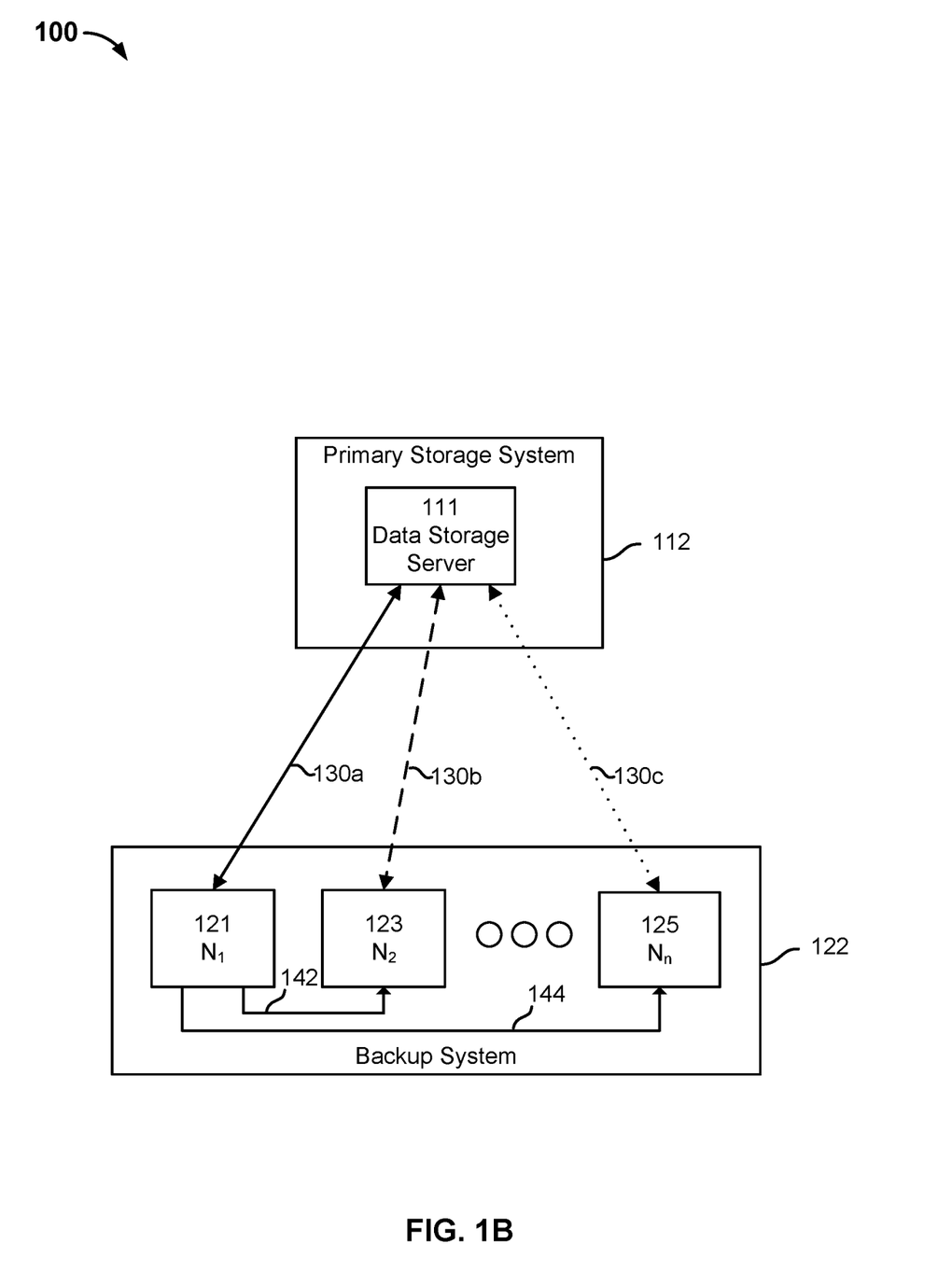
FIG. 1B is a block diagram illustrating an embodiment of a system for adaptively throttling metadata requests.

FIG. 1B is a block diagram illustrating an embodiment of a system for adaptively throttling metadata requests. In the example shown, backup system 122 is comprised of backup nodes 121, 123, 125. Backup nodes 121, 123, 125 are coupled to data storage server 111 via connections 130a, 130b, 130c, respectively. Backup node 121 acts as a primary node of backup system 122. Backup node 121 is configured to determine a performance metric of primary storage system 112. In some embodiments, the performance metric of primary storage system 112 is directly determined. For example, backup node 121 may poll primary storage system 112 for a current CPU utilization value. In some embodiments, a performance metric of primary storage system 112 is indirectly determined. For example, the performance metric of primary storage system 112 may be determined based on a round trip time associated with a communication between the backup node 121 and primary storage system 112.

Backup node 121 is configured to provide the determined performance metric to backup nodes 123, 125 via respective connections 142, 144. In response to receiving the determined performance metric, backup nodes 123, 125 are configured to determine a corresponding cost associated with a request for metadata associated with a file directory structure object and a corresponding cost associated with a request for data content associated with a file directory structure object based on the determined performance metric. Backup node 121 is configured to periodically determine the performance metric and provide an updated performance metric to the backup nodes 123, 125.

A file directory structure of the primary snapshot is divided into a plurality of portions. In some embodiments, some of the backup nodes 121, 123, 125 are assigned a corresponding portion of the file directory structure of the primary snapshot. In some embodiments, each of the backup nodes 121, 123, 125 are assigned a corresponding portion of the file directory structure of the primary snapshot. The backup nodes that are assigned a portion of the file directory structure are configured to, in parallel, traverse the assigned portion of the file directory structure, identify changed objects, and backup the identified changed objects.

Figure 1C:
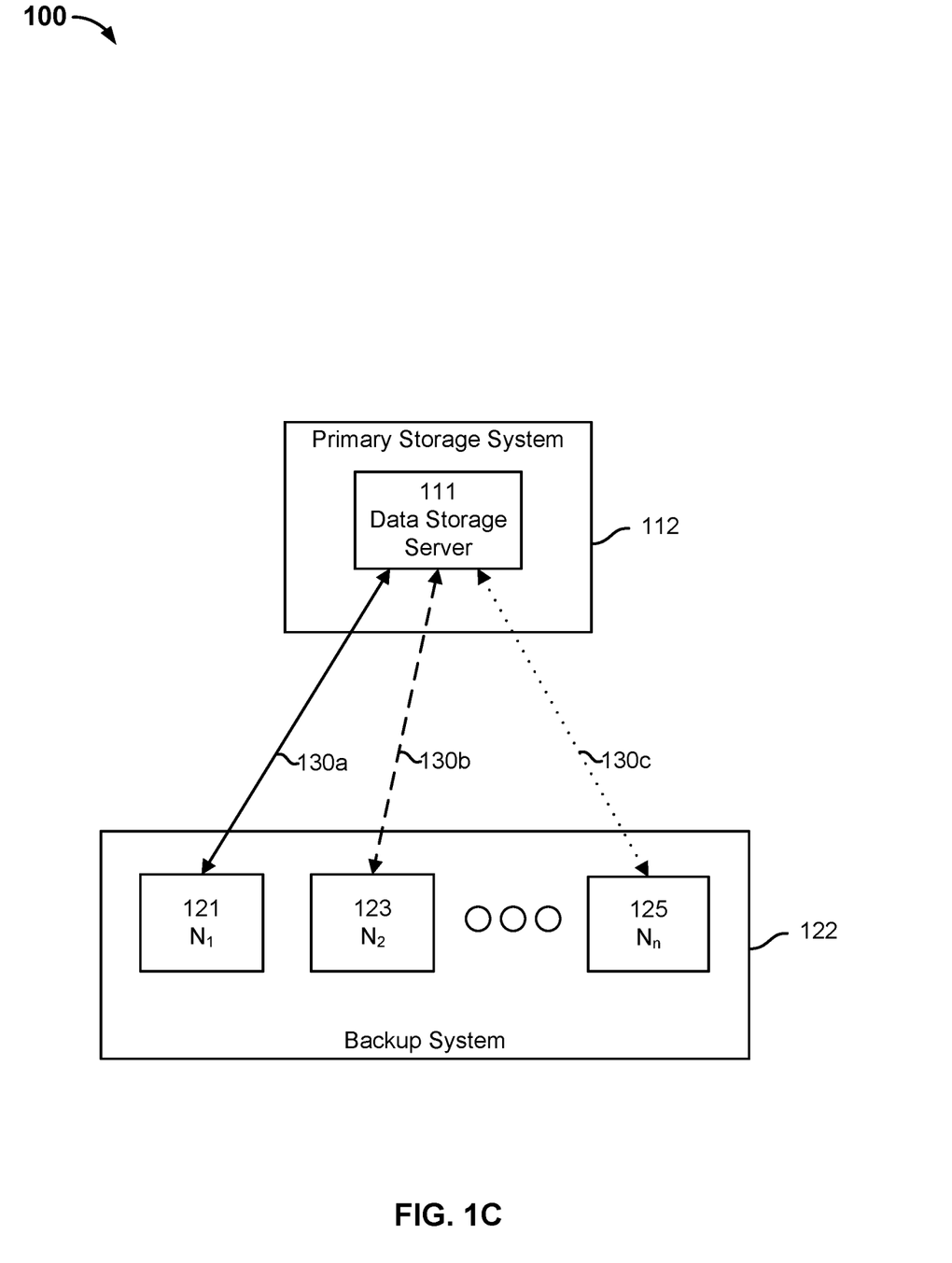
FIG. 1C is a block diagram illustrating an embodiment of a system for adaptively throttling metadata requests.

FIG. 1C is a block diagram illustrating an embodiment of a system for adaptively throttling metadata requests. In the example shown, backup system 122 is comprised of backup nodes 121, 123, 125. Backup nodes 121, 123, 125 are coupled to data storage server 111 via connections 130a, 130b, 130c, respectively. Each of the backup nodes 121, 123, 125 is configured to determine a performance metric of the primary storage system.

In some embodiments, the performance metric of primary storage system 112 is directly determined. For example, backup nodes 121, 123, 125 may separately poll primary storage system 112 for a current CPU utilization value. In some embodiments, a performance metric of primary storage system 112 is indirectly determined. For example, the performance metric of primary storage system 112 may be separately determined based on a round trip time associated with a communication between backup nodes 121, 123, 125 and primary storage system 112.

In response to determining performance metric, backup nodes 123, 125 are configured to determine a corresponding cost associated with a request for metadata associated with a file directory structure object and a corresponding cost associated with a request for data content associated with a file directory structure object based on the determined performance metric.

A file directory structure of the primary snapshot is divided into a plurality of portions. In some embodiments, some of the backup nodes 121, 123, 125 are assigned a corresponding portion of the file directory structure of the primary snapshot. In some embodiments, each of the backup nodes 121, 123, 125 are assigned a corresponding portion of the file directory structure of the primary snapshot. The backup nodes that are assigned a portion of the file directory structure are configured to, in parallel, traverse the assigned portion of the file directory structure, identify changed objects, and backup the identified changed objects.

Figure 2:
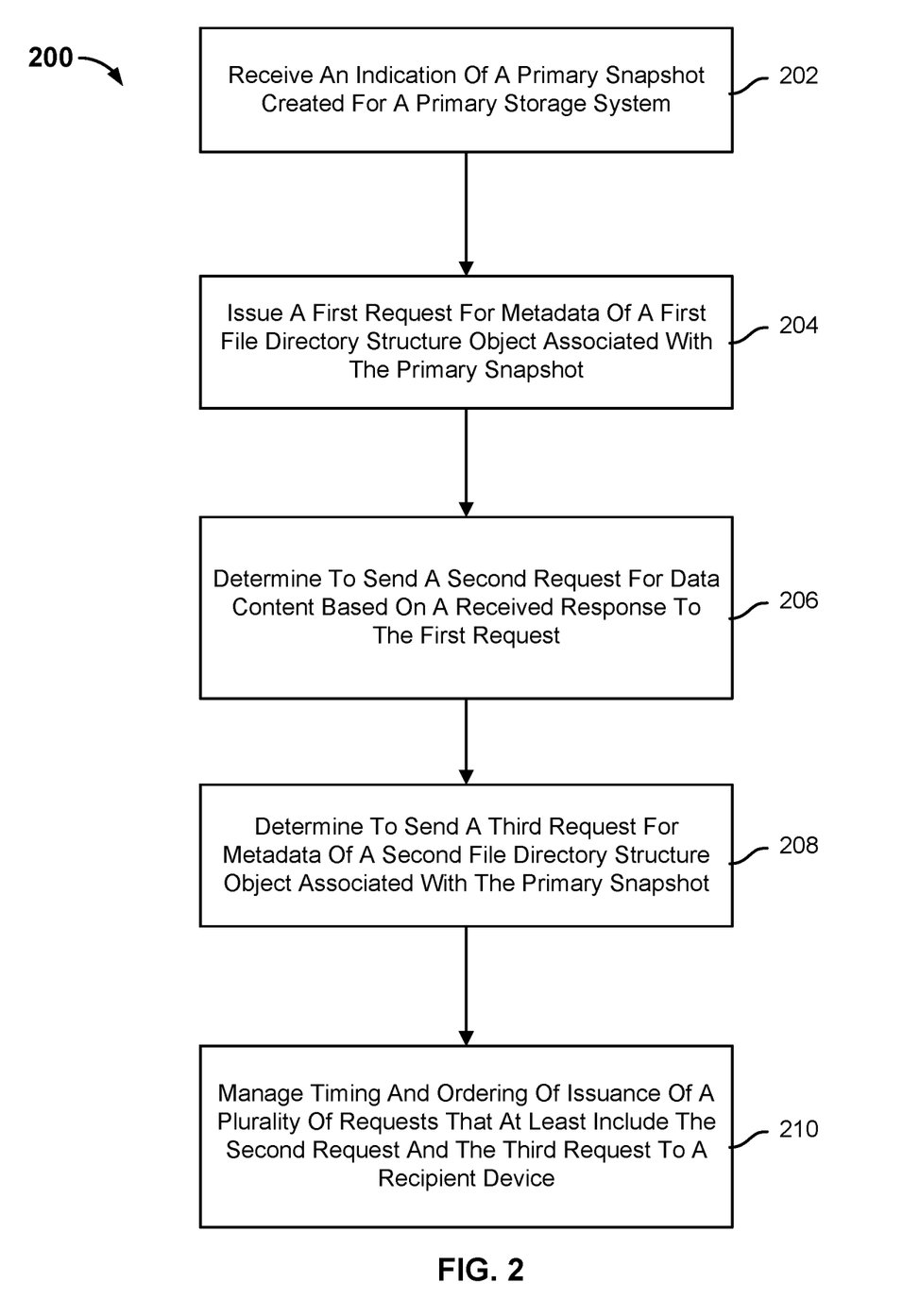
FIG. 2 is a flow diagram illustrating an embodiment of a process for adaptively throttling metadata requests.

FIG. 2 is a flow diagram illustrating an embodiment of a process for adaptively throttling metadata requests. In the example shown, process 200 may be implemented by a backup node, such as backup nodes 121, 123, 125.

At 202, an indication of a primary snapshot created for a primary storage system is received. An incremental backup of the primary storage system may be performed using the primary snapshot. A backup system performs a complete traversal of a file directory structure of the primary snapshot to identify file directory structure objects that have changed since a previous backup.

A file directory structure of the primary snapshot is comprised of a plurality of file directory structure nodes. The backup system is comprised of a plurality of backup nodes. In some embodiments, a back node is assigned to the entire file directory structure of the primary snapshot. The backup node is configured to traverse the file directory structure, identify changed objects, and backup the identified changed objects.

In some embodiments, the file directory structure of the primary snapshot is divided into a plurality of portions. In some embodiments, some of the backup nodes are assigned a corresponding portion of the file directory structure of the primary snapshot. In some embodiments, each of the backup nodes are assigned a corresponding portion of the file directory structure of the primary snapshot. The backup nodes that are assigned a portion of the file directory structure are configured to, in parallel, traverse the assigned portion of the file directory structure, identify changed objects, and backup the identified changed objects.

The backup node may traverse the assigned portion of the file directory structure in-order, preorder, postorder, or level order.

At 204, a first request for metadata of a first file directory structure object associated with the primary snapshot is issued. The first file directory structure object corresponds to a first node of the file directory structure. The requested metadata associated with a file directory structure object may indicate whether a directory has been added to the file directory structure, whether a file has been renamed, whether a file has been modified, what files are included in a directory, etc.

At 206, a second request for data content based on a received response to the first request is determined to be sent to a recipient device.

The primary storage system is configured to provide the metadata associated with a file directory structure object in response to receiving a request for metadata associated with the file directory structure object. In some embodiments, the received response indicates that a file directory structure object associated with the requested metadata has changed since a previous backup. This indicates that there is a need for a second request for data content that corresponds to the file directory structure object associated with the requested metadata.

At 208, a third request for metadata of a second file directory structure object associated with the primary snapshot is determined to be sent to the recipient device. The backup node needs to complete a traversal of an assigned portion of file directory structure. The second file directory structure object corresponds to a next node of the file directory structure traversal.

At 210, timing and ordering of issuance of a plurality of requests that at least include the second request and the third request to a recipient device is managed based on a performance metric of the recipient device and corresponding relative impact to the performance metric of the recipient device.

The backup node manages timing and ordering of a plurality of requests for metadata associated with file directory structure objects and requests for data content associated with file directory structure objects utilizing a token request system. The token request system is used to prevent the determined performance metric of the recipient device from exceeding the CPU threshold for one or more processes. In some embodiments, the backup node utilizes a single queue for metadata and data content requests to manage timing and ordering of requests for metadata associated with file directory structure objects and requests for data content associated with file directory structure objects. In some embodiments, the backup node utilizes separate queues for metadata requests and data content requests to manage timing and ordering of requests for metadata associated with file directory structure objects and requests for data content associated with file directory structure objects.

A backup node is configured to assign a cost to a particular type of request, i.e., the number of tokens needed to issue the request. The number of tokens needed to issue a request may be heuristic-based from historical data and metadata requests. The number of tokens needed to issue a request varies based on a current performance metric of the primary storage system. The cost for a particular type of request assigned by the backup node at a particular moment is time is based on a determined performance metric of the primary storage system. As the backup node traverses an assigned portion of the file directory structure, the backup node issues to the recipient device requests for metadata associated with a file directory structure object and/or data content associated with a file directory structure object. The backup node is able to send the request based on whether the backup node has a sufficient number of tokens to issue the request. The backup node consumes tokens from the total number of available tokens when a request is issued. The cost associated with a request for metadata associated with a file directory structure object is greater than (e.g., 2×) the cost associated with a request for data content associated with a file directory structure object, that is, a request for metadata associated with a file directory structure object requires more tokens than a request for data content associated with a file directory structure object. The assigned cost, the number of available tokens, or both, is dynamic in nature and is periodically updated based on a determined performance metric of the primary storage system. This throttles the requests for metadata associated with a plurality of file directory structure objects in a manner that reduces the likelihood that the primary storage system's CPU resource limit is exceeded while enabling data content associated with file directory structure objects to be ingested by the backup node in a manner that does not underutilize the resources or overwhelm the backup node.

Figure 3:
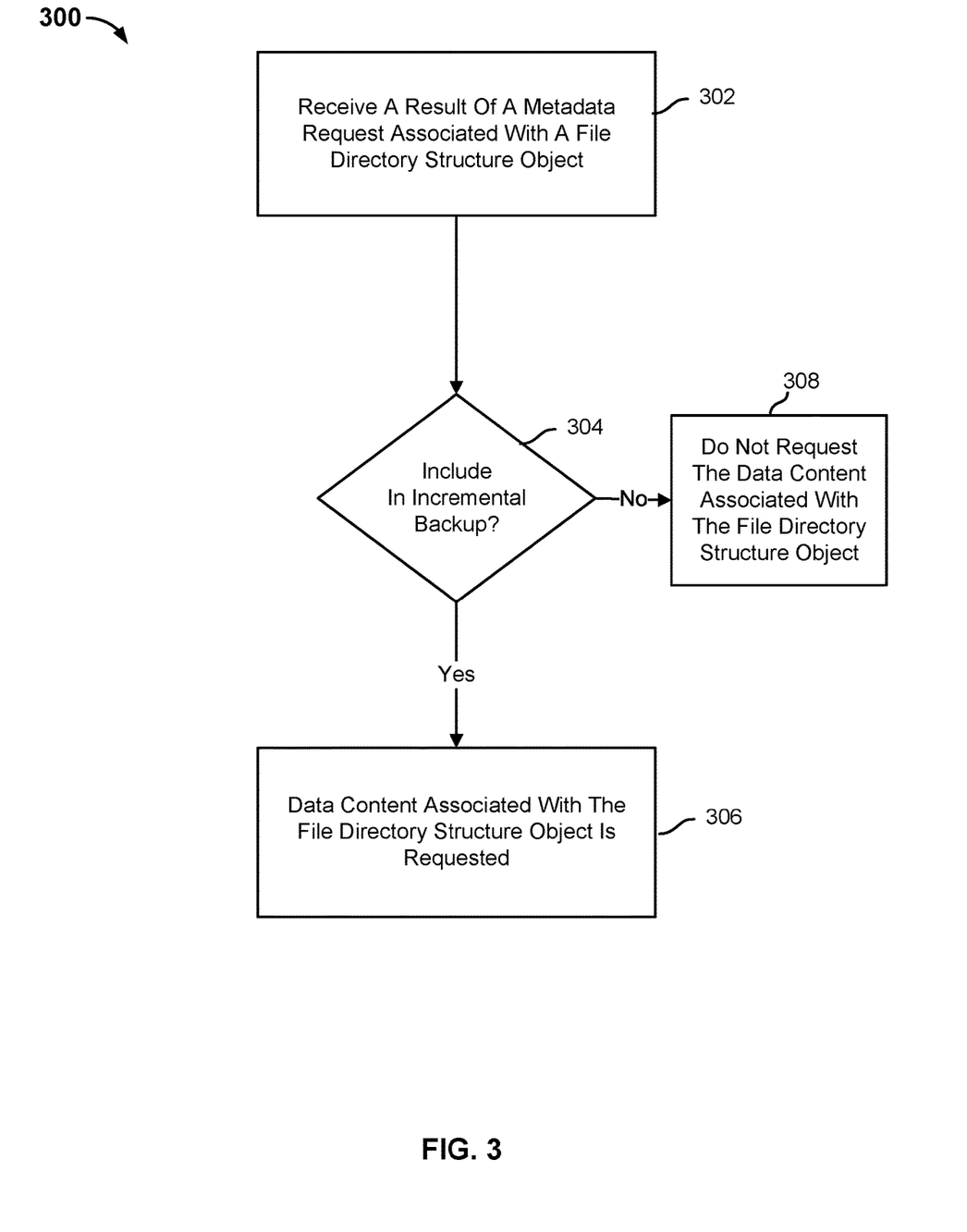
FIG. 3 is a flow diagram illustrating a process for requesting data content associated with a file directory structure object.

FIG. 3 is a flow diagram illustrating a process for requesting data content associated with a file directory structure object. In some embodiments, process 300 may be implemented by a backup node, such as backup nodes 121, 123, 125. In the example shown, process 300 may be implemented to perform some or all of step 206 of process 200.

At 302, a result of a metadata request associated with a file directory structure object is received. A backup node sends to a recipient device a request for metadata associated with a file directory structure object. The requested metadata associated with a file directory structure object may indicate whether a directory has been added to the file directory structure, whether a file has been modified, whether a file has been renamed, what files are included in a directory, etc.

At 304, it is determined whether the result of the metadata request indicates to include in an incremental backup data content associated with the file directory structure object.

In the event it is determined that the result of the metadata request indicates to include in an incremental backup data content associated with the file directory structure object, process 300 proceeds to 306. In the event it is determined that the result of the metadata request does not indicate to include in an incremental backup data content associated with the file directory structure object, process 300 proceeds to 308.

At 306, data content associated with the file directory structure object is requested.

In some embodiments, the backup node maintains a queue for object metadata and object data requests. The backup node is configured to add to the rear of the queue for object metadata and object data requests a request for the data content associated with a changed file directory structure object. When the request for the data content associated with a changed file directory structure object reaches the front of the queue for object metadata and object data requests, the backup node determines whether it has enough tokens to issue a request for data content associated with a changed file directory structure object. In the event the backup node has enough tokens to issue the request, the backup node sends to the primary storage system the request for data content associated with the changed file directory structure object. In the event the backup node does not have enough tokens to issue the request, the backup node waits, as described with respect to FIG. 4, until it has enough tokens to issue the request.

In some embodiments, the backup node maintains a queue for object metadata requests and a queue for object data content requests. The backup node is configured to add a request for the data content associated with a changed file directory structure object to the queue for object data content requests. Requests included in the queue for object data content requests are given priority over requests included in the queue for object metadata requests. The queue for object metadata requests may include one or more requests and the backup node may have sufficient tokens to issue one or more of those requests, but in the event there is a request in the queue for object data content requests and the backup node has sufficient tokens to issue an object data content request, the backup node prioritizes the object data content request over the one or more object metadata requests. In the event the backup node has enough tokens to issue the object data content request, the backup node sends to the primary storage system the request for data content associated with the changed file directory structure object. In the event the backup node has insufficient tokens to issue the request, the request for data content associated with the changed object remains in the queue for object data requests until the backup node, as described with respect to FIG. 5, has a sufficient number of tokens to issue the request.

At 308, the data content associated with the file directory structure object is not requested.

Figure 4:
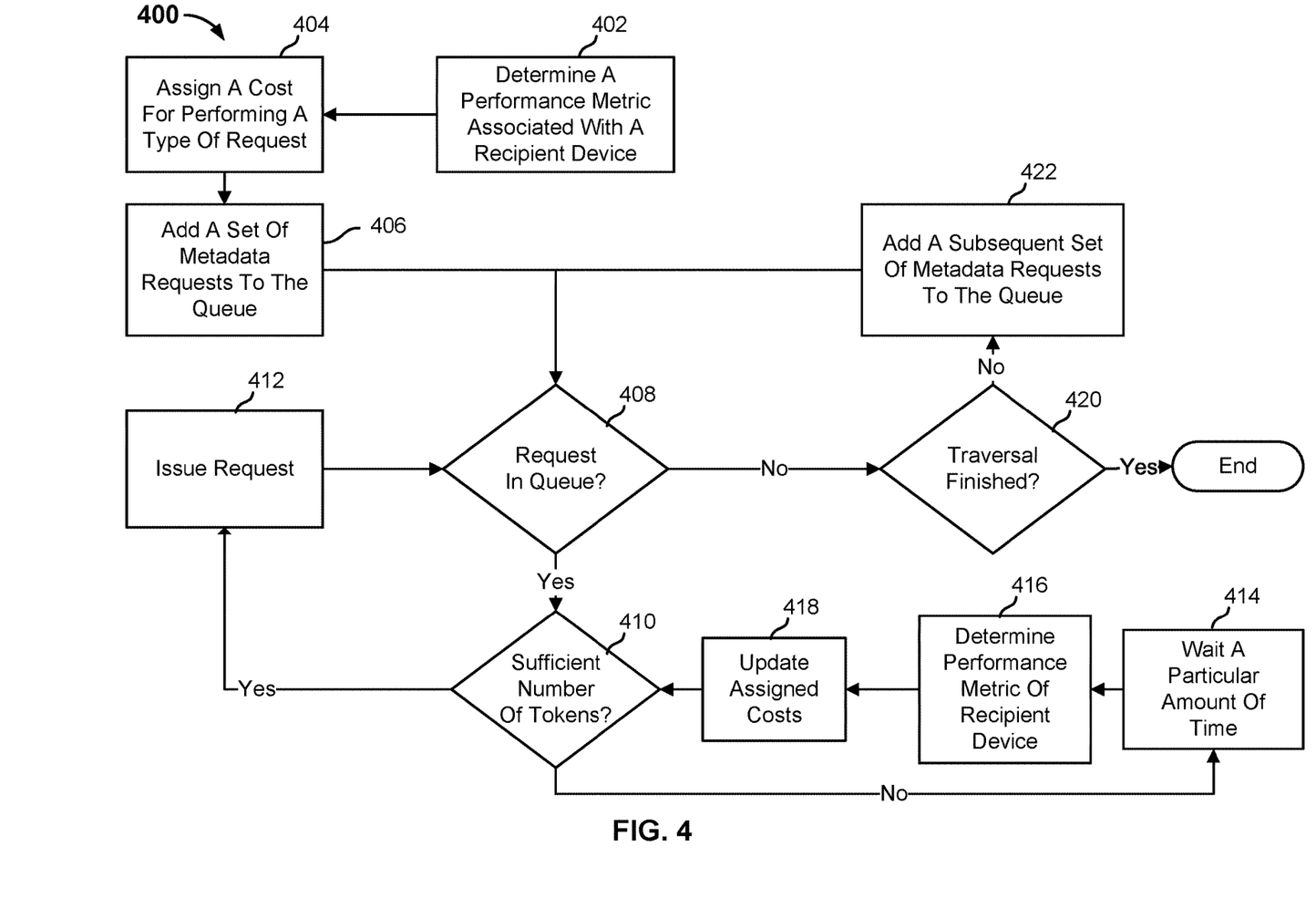
FIG. 4 is a flow diagram illustrating a process for managing timing and ordering of issuance of requests.

FIG. 4 is a flow diagram illustrating a process for managing timing and ordering of issuance of requests. In some embodiments, process 400 may be implemented by a backup node, such as backup nodes 121, 123, 125. In the example shown, process 400 may be implemented to perform some or all of step 210 of process 200.

At 402, a performance metric associated with a recipient device is determined.

In some embodiments, the backup node is a primary backup node of the backup system and determines a performance metric of the primary storage system (e.g., CPU utilization). In some embodiments, the backup node is a secondary backup node of the backup system and receives the determined performance metric from a primary backup node of the backup system. In some embodiments, the backup node independently determines a performance metric of the primary storage system. The performance metric of the primary storage system may be periodically determined (e.g., every 10 seconds).

In some embodiments, the performance metric of the primary storage system is directly determined. For example, the backup node may poll the primary storage system for a current CPU utilization value. In some embodiments, the performance metric of the primary storage system is indirectly determined. For example, the performance metric of the primary storage system may be determined based on a round trip time associated with a communication between the backup node and the primary storage system.

At 404, a cost for performing a type of request is assigned. A backup node maintains a token request system. The backup node generates a particular number of tokens per second. In some embodiments, the rate at which a backup node generates tokens is reduced in the event the determined performance metric is high (e.g., above a performance metric threshold). In some embodiments, the rate at which a backup node generates tokens is increased in the event the determined performance metric is low (e.g., below a performance metric threshold).

The backup node is configured to assign a cost to a particular type of request, i.e., the number of tokens needed to issue the request, based on the determined performance metric. The cost associated with a request for metadata associated with a file directory structure object is greater than (e.g., 2×) the cost associated with a request for data content associated with a file directory structure object, that is, a request for metadata associated with a file directory structure object requires more tokens than a request for data content associated with a file directory structure object. The assigned cost, the number of available tokens, or both, is dynamic in nature and is periodically updated based on a determined performance metric of the primary storage system.

At 406, an initial set of metadata requests is added to a queue for object metadata requests and object data content requests. When traversing an assigned portion of the file directory structure, a backup node initially adds to the queue for object metadata and object data requests a set of one or more requests for metadata associated with one or more file directory structure objects. In some embodiments, a preconfigured number of requests is included in a set (e.g., 10 requests). Each metadata request corresponds to a node of the file directory structure.

At 408, it is determined whether there are any requests in the queue for object metadata and object data content requests.

In the event there are any requests in the queue for object metadata and object data content requests, process 400 proceeds to 410. In the event there are no requests in the queue for object metadata and object data content requests, process 400 proceeds to 420.

At 410, it is determined whether the backup node has a sufficient number of tokens to perform the request at the front of the queue for object metadata and object data content requests. Each of the requests requires a particular number of tokens to be issued. The number of tokens depends on the determined performance metric of the recipient device.

In some embodiments, a request for metadata associated with a file directory structure object is at the front of the queue for object metadata and object data content requests. The backup node determines whether it has a sufficient number of tokens to issue the request for metadata associated with the file directory structure object.

In the event a response to the metadata request indicates the file directory structure object has changed since a previous backup, a request for data content associated with the file directory structure object is added to the rear of the queue for object metadata and object data content requests. At some point in time, the request for data content associated with the file directory structure object reaches the front of the queue for object metadata and object data content requests. Subsequently, the backup node determines whether it has a sufficient number of tokens to issue the request for data content associated with the file directory structure object.

In the event there a sufficient number of tokens to issue the request at the front of the queue for object metadata and object data content requests, process 400 proceeds to 412. In the event there are an insufficient number of tokens to issue the request at the front of the queue for object metadata and object data content requests, the request remains at the front of the queue for object metadata and object data content requests and process 400 proceeds to 414. In such a scenario, the backup node waits a particular amount of time and re-evaluates whether to send the request for data content associated with a first file directory structure object, a request for metadata associated with a second file directory structure object, or both.

The number of tokens generated by a backup node is reset after a predetermined interval (e.g., 5 minutes) to prevent a backup node from accumulating tokens and causing a spike in the primary storage system's CPU resources when the node backup spends the accumulated tokens and issues a plurality of requests.

In some embodiments, in the event there are an insufficient number of tokens to issue the request at the front of the queue for object metadata and object data content requests, the backup node determines whether there are a sufficient number of tokens to issue the next request in the queue. In the event there are a sufficient number of tokens to issue the next request in the queue, process 400 proceeds to 412 where the next request is issued. In the event there are insufficient number of tokens to issue the next request in the queue, process 400 proceeds to 414.

At 412, the backup node issues the request at the front of the queue for object metadata and object data content requests. The backup node consumes tokens from the total number of available tokens when a request is issued. In some embodiments, the request is a request for metadata associated with a file directory structure object. In some embodiments, the request is a request for data content associated with a file directory structure object.

At 414, the backup node waits a particular amount of time to re-evaluate whether it has a sufficient number of tokens to issue the request. The backup node generates a particular number of tokens per second. Although the backup node may not have a sufficient number of tokens to issue the request at a first point in time, the backup node may have a sufficient number of tokens to issue the request after the backup nodes waits the particular amount of time. Waiting for the backup node to have a sufficient number of tokens to issue a metadata request throttles the requests for metadata associated with a plurality of objects in a manner that reduces the likelihood that the primary storage system's CPU resource limit is exceeded.

At 416, a performance metric of the recipient device is determined. The performance metric of the recipient device may be determined in a similar manner as described with respect to step 402.

At 418, costs for performing a type of request are updated. The cost to issue a request for metadata associated with a file directory structure object and the cost to issue a request for data content associated with a file directory structure object are updated based on the determined performance metric.

In some embodiments, steps 416 and/or 418 are optional because the backup node periodically determines a performance metric of the recipient device and updates assigned costs for performing a type of request regardless of whether the backup node did not have a sufficient number of tokens to issue a request.

At 420, it is determined whether a traversal of the assigned file directory structure has finished. In the event the traversal of the assigned file directory structure has not finished, process 400 proceeds to 422.

At 422, a subsequent set of metadata requests is added to the queue for object metadata and object data content requests. In some embodiments, there are one or more object data content requests included in the queue when the subsequent set of metadata requests is added to the queue. In some embodiments, there are no object data content requests included in the queue when the subsequent set of metadata requests is added to the queue.

The one or more requests for metadata associated with one or more file directory structure objects included in the subsequent set correspond to a next part of the assigned portion of the file directory structure that is traversed by the backup node. The backup node utilizes process 400 to determine whether to fulfill a request for metadata associated with a file directory structure object included in the queue for object data content and object metadata requests.

In the event the traversal of the assigned file directory structure has finished, process 400 ends. The process of adding a subsequent set of one or more requests for metadata associated with one or more file directory structure objects to the queue for object metadata and object data requests after the backup node has issued a previous set of one or more requests for metadata associated with one or more file directory structure objects continues until the backup node has completed traversing an assigned portion of the file directory structure.

The backup node utilizes the token request system to determine whether to issue a request for metadata associated with a file directory structure object included in the queue or to issue a request for data content associated with a file directory structure object included in the queue. This throttles the requests for metadata associated with a plurality of objects in a manner that reduces the likelihood that the primary storage system's CPU resource limit is exceeded while enabling data associated with changed objects to be ingested by the backup node in a manner that does not underutilize the resources or overwhelm the backup node.

Figure 5:
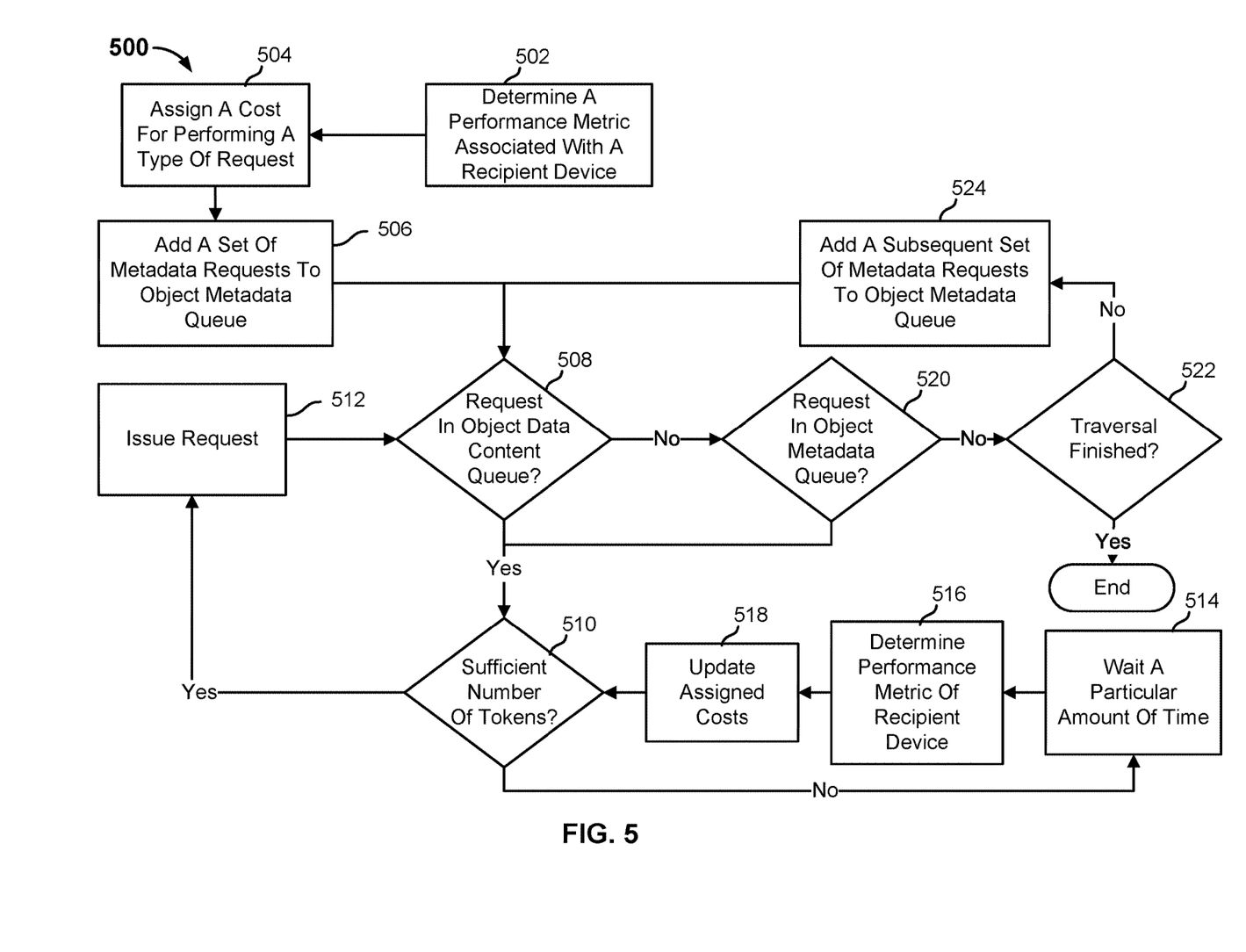
FIG. 5 is a flow diagram illustrating a process for managing timing and ordering of issuance of requests.

FIG. 5 is a flow diagram illustrating a process for managing timing and ordering of issuance of requests. In example shown, process 500 may be implemented by a backup node, such as backup nodes 121, 123, 125. In some embodiments, process 500 is implemented to perform some or all of step 210 of process 200.

At 502, a performance metric associated with a recipient device is determined.

In some embodiments, the backup node is a primary backup node of the backup system and determines a performance metric of the primary storage system (e.g., CPU utilization). In some embodiments, the backup node is a secondary backup node of the backup system and receives the determined performance metric from a primary backup node of the backup system. In some embodiments, the backup node independently determines a performance metric of the primary storage system. The performance metric of the primary storage system may be periodically determined (e.g., every 10 seconds).

In some embodiments, the performance metric of the primary storage system is directly determined. For example, the backup node may poll the primary storage system for a current CPU utilization value. In some embodiments, the performance metric of the primary storage system is indirectly determined. For example, the performance metric of the primary storage system may be determined based on a round trip time associated with a communication between the backup node and the primary storage system.

At 504, a cost for performing a type of request is assigned. A backup node maintains a token request system. The backup node generates a particular number of tokens per second. In some embodiments, the rate at which a backup node generates tokens is reduced in the event the determined performance metric is high (e.g., above a performance metric threshold). In some embodiments, the rate at which a backup node generates tokens is increased in the event the determined performance metric is low (e.g., below a performance metric threshold).

The backup node is configured to assign a cost to a particular type of request, i.e., the number of tokens needed to issue the request, based on the determined performance metric. The cost associated with a request for metadata associated with a file directory structure object is greater than (e.g., 2×) the cost associated with a request for data content associated with a file directory structure object, that is, a request for metadata associated with a file directory structure object requires more tokens than a request for data content associated with a file directory structure object. The assigned cost, the number of available tokens, or both, is dynamic in nature and is periodically updated based on a determined performance metric of the primary storage system.

At 506, an initial set of metadata requests is added to a queue for object metadata requests and object data content requests. When traversing an assigned portion of the file directory structure, a backup node initially adds to the queue for object metadata requests a set of one or more requests for metadata associated with one or more file directory structure objects. In some embodiments, a preconfigured number of requests is included in a set (e.g., 10 requests).

At 508, it is determined whether there are any requests in the queue for object data content requests. The backup node maintains a queue for object metadata requests and a queue for object data content requests. A weight associated with a queue for object data content requests may be greater than a weight associated with a queue for object metadata requests, such that requests in the queue for object data content requests are fulfilled more preferentially than requests in the metadata request queue. In some embodiments, the weight associated with a queue for object data content requests is equal to the weight associated with a queue for object metadata requests.

The primary storage system is configured to provide the metadata associated with a file directory structure object in response to receiving a request for metadata associated with the file directory structure object. The metadata associated with a file directory structure object may indicate that the file directory structure object has changed since a previous backup and should be included in an incremental backup of the primary storage system. The backup node is configured to add a request for the data content associated with a changed file directory structure object to the queue for object data content requests.

In the event there are requests in the queue for object data content requests, process 500 proceeds to 510. In the event there are no requests in the queue for object data content requests, process 500 proceeds to 520. Requests included in the queue for object data content requests are given priority over requests included in the queue for object metadata requests. The queue for object metadata requests may include one or more requests and the backup node may have sufficient tokens to issue one or more of those requests, but in the event there is a request in the queue for object data content requests and the backup node has sufficient tokens to issue an object data content request, the backup node prioritizes the object data content request over the one or more object metadata requests. This throttles the requests for metadata associated with a plurality of file directory structure objects in a manner that reduces the likelihood that the primary storage system's CPU resource limit is exceeded.

At 510, it is determined whether the backup node has a sufficient number of tokens to issue the request. In the event there a sufficient number of tokens to issue the request, process 500 proceeds to 512. In some embodiments, the request is a request for data content associated with a file directory structure object. In some embodiments, the request is a request for metadata associated with a file directory structure object.

In the event there are an insufficient number of tokens to issue the request at the front of the queue, process 500 proceeds to 514. In such a scenario, the backup node waits a particular amount of time and re-evaluates whether to send the request for data content associated with a first file directory structure object, a request for metadata associated with a second file directory structure object, or both. In some embodiments, there are an insufficient number of tokens to perform the request at the front of the queue for object data content requests. In the event the backup node has an insufficient number of tokens to issue the request, the request for data content associated with the file directory structure object remains in the queue for object data content requests until the backup node has a sufficient number of tokens to issue the request.

In some embodiments, there are an insufficient number of tokens to issue the request at the front of the queue for object metadata requests. In the event the backup node has insufficient tokens to issue the request, the request for metadata associated with the object remains in the queue for object metadata requests until the backup node has a sufficient number of tokens to issue the request.

The number of tokens generated by a backup node is reset after a predetermined interval (e.g., 5 minutes) to prevent a backup node from accumulating tokens and causing a spike in the primary storage system's CPU resources when the node backup spends the accumulated tokens and issues a plurality of requests.

In some embodiments, in the event there are an insufficient number of tokens to issue the request at the front of the queue for object metadata requests, the backup node determines whether there are a sufficient number of tokens to issue a request at the front of the queue for object data content requests. In the event there are a sufficient number of tokens to issue the request at the front of the queue for object data content requests, process 500 proceeds to 512 where the request at the front of the queue for object data content requests is issued. In the event there are insufficient number of tokens to issue the request at the front of the queue for object data content requests, process 500 proceeds to 514.

At 512, the backup node issues the request at the front of the queue. The backup node consumes tokens from the total number of available tokens when a request is issued. In some embodiments, the issued request is a request at the front of the queue for object data content requests. In some embodiments, the issued request is a request at the front of the queue for object metadata requests.

At 514, the backup node waits a particular amount of time to re-evaluate whether it has a sufficient number of tokens to issue the request. The backup node generates a particular number of tokens per second. Although the backup node may not have a sufficient number of tokens to issue the request at a first point in time, the backup node may have a sufficient number of tokens to issue the request after the backup nodes waits the particular amount of time. Waiting for the backup node to have a sufficient number of tokens to issue a metadata request throttles the requests for metadata associated with a plurality of objects in a manner that reduces the likelihood that the primary storage system's CPU resource limit is exceeded.

At 516, a performance metric of the recipient device is determined. The performance metric of the recipient device may be determined in a similar manner as described with respect to step 502.

At 518, costs for performing a type of request are updated. The cost to issue a request for metadata associated with a file directory structure object and the cost to issue a request for data content associated with a file directory structure object are updated based on the determined performance metric.

In some embodiments, steps 516 and/or 518 are optional. For example, in some embodiments, the backup node periodically determines a performance metric of the recipient device and updates assigned costs for performing a type of request regardless of whether the backup node did not have a sufficient number of tokens to issue a request.

At 520, it is determined whether there are any requests in the queue for object metadata requests. In the event there are requests in the queue for object metadata requests, process 500 proceeds to 510. In the event there are no requests in the queue for object metadata requests, process 500 proceeds to 522.

At 522, it is determined whether a traversal of the assigned file directory structure has finished. In the event the traversal of the assigned file directory structure has not finished, process 500 proceeds to 524.

At 524, a subsequent set of metadata requests is added to the queue for object metadata requests. The one or more requests for metadata associated with one or more file directory structure objects included in the subsequent set correspond to a next part of the assigned portion of the file directory structure that is traversed by the backup node. The backup node utilizes process 500 to determine whether to fulfill a request for metadata associated with a file directory structure object included in the queue for object metadata requests or to fulfill a request for data content associated with a file directory structure object included in the queue for object data requests.

As the backup node continues to traverse an assigned portion of the file directory structure, the backup node is configured to add a subsequent set of one or more metadata requests to the queue for object metadata requests after the backup node has issued a previous set of metadata requests.

In the event the traversal of the assigned file directory structure has finished, process 500 ends. The process of adding a subsequent set of one or more requests for metadata associated with one or more file directory structure objects to the queue for object metadata requests after the backup node has issued a previous set of one or more requests for metadata associated with one or more file directory structure objects continues until the backup node has completed traversing an assigned portion of the file directory structure. The backup node continues to utilize the token request system to determine whether to fulfill a request for metadata associated with a file directory structure object included in the queue for object metadata requests or to fulfill a request for data content associated with a file directory structure object included in the queue for object data requests. This throttles the requests for metadata associated with a plurality of objects in a manner that reduces the likelihood that the primary storage system's CPU resource limit is exceeded while enabling data associated with changed objects to be ingested by the backup node in a manner that does not underutilize the resources or overwhelm the backup node.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    determining a performance metric associated with a recipient device;
    assigning a cost for performing a type of request based on the determined performance metric associated with the recipient device;
    adding an initial set of metadata requests to a queue;
    determining whether a backup node has a threshold number of tokens to issue a first request included in the initial set of metadata requests at a front of the queue, wherein the first request has the assigned cost; and
    issuing to the recipient device the first request at the front of the queue in response to a determination that the backup node has the threshold number of tokens to issue the request at the front of the queue.

2. The method of claim 1, wherein the queue is a queue for object metadata requests and object data content requests.

3. The method of claim 1, wherein the queue is a queue for object metadata requests.

4. The method of claim 1, wherein the determined performance metric associated with the recipient device is a CPU utilization of the recipient device.

5. The method of claim 1, wherein the determined performance metric associated with the recipient device is directly determined by the backup node of a backup system.

6. The method of claim 1, wherein the determined performance metric associated with the recipient device is indirectly determined by the backup node of a backup system.

7. The method of claim 1, wherein the backup node generates a particular number of tokens per second.

8. The method of claim 7, wherein a rate at which the backup node generates the particular number of tokens is based on the determined performance metric associated with the recipient device.

9. The method of claim 7, wherein a rate at which the backup node generates the particular number of tokens is reduced in response to a determination that the performance metric is above a performance metric threshold.

10. The method of claim 7, wherein a rate at which the backup node generates the particular number of tokens is increased in response to a determination that the performance metric is below a performance metric threshold.

11. The method of claim 1, the cost assigned to a metadata request associated with a file directory structure object is greater than the cost assigned to a data content request associated with the file directory structure object.

12. The method of claim 1, wherein the assigned cost is dynamically determined based on the performance of the recipient device.

13. The method of claim 1, wherein the assigned cost is periodically updated.

14. The method of claim 1, wherein the initial set of metadata requests is a preconfigured number of requests.

15. The method of claim 1, wherein each metadata request included in the initial set of metadata requests corresponds to a node of a file directory structure.

16. The method of claim 1, further comprising resetting a number of tokens generated by the backup node after a predetermined interval.

17. The method of claim 1, further comprising adding a subsequent set of metadata requests to the queue.

18. The method of claim 17, further comprising:
    waiting a particular amount of time in response to a determination that the backup node does not have the threshold number of tokens to issue a second request at the front of the queue; and
    re-evaluating whether the backup node has the threshold number of tokens to issue the second request at the front of the queue after waiting the particular amount of time.

19. A computer program product embodied in a non-transitory computer readable medium and comprising computer instructions for:
    determining a performance metric associated with a recipient device;
    assigning a cost for performing a type of request based on the determined performance metric associated with the recipient device;
    adding an initial set of metadata requests to a queue;

determining whether a backup node has a threshold number of tokens to issue a first request included in the initial set of metadata requests at a front of the queue, wherein the first request has the assigned cost; and issuing to the recipient device the first request at the front of the queue in response to a determination that the backup node has the threshold number of tokens to issue the request at the front of the queue.

20. A system, comprising:

a processor configured to:
- determine a performance metric associated with a recipient device;
- assign a cost for performing a type of request based on the determined performance metric associated with the recipient device;
- add an initial set of metadata requests to a queue;
- determine whether a backup node has a threshold number of tokens to issue a first request at a front of the queue; and
- issue to the recipient device the first request at the front of the queue in response to a determination that the backup node has the threshold number of tokens to issue the request included in the initial set of metadata requests at the front of the queue, wherein the first request has the assigned cost; and a memory coupled to the processor and configured to provide the processor with instructions.

* * * * *